Sept. 6, 1927.   F. M. GUNN   1,641,267
AUTOMATIC MEASURING VALVE
Filed Jan. 19, 1926   2 Sheets-Sheet 1

Inventor
Fred M. Gunn
By Lancaster and Allwein
Attorneys

Sept. 6, 1927.  F. M. GUNN  1,641,267
AUTOMATIC MEASURING VALVE
Filed Jan. 19, 1926   2 Sheets-Sheet 2
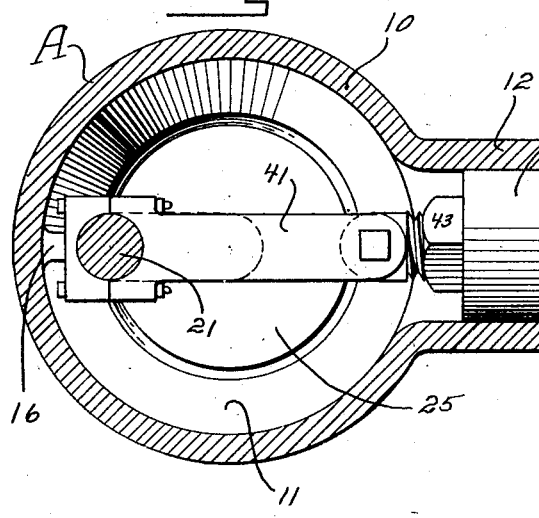
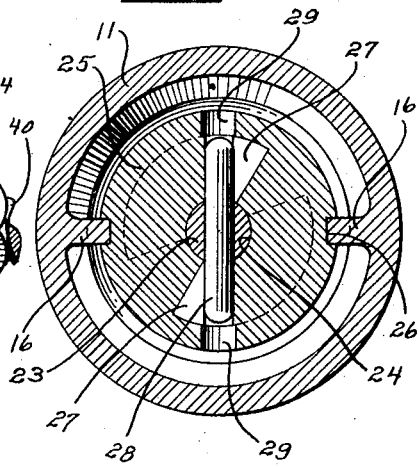
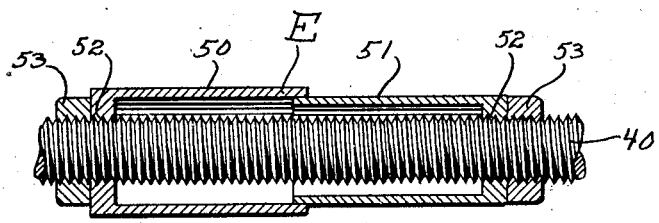
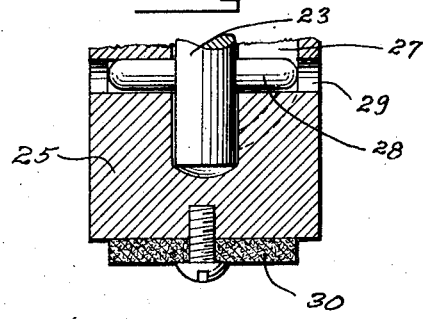
Inventor
Fred M. Gunn
By Lancaster and Allwine
Attorneys Patented Sept. 6, 1927.

1,641,267

UNITED STATES PATENT OFFICE.

FRED M. GUNN, OF EL PASO, TEXAS.

AUTOMATIC MEASURING VALVE.

Application filed January 19, 1926. Serial No. 82,374.

The present invention relates to liquid measuring and dispensing apparatus, primarily intended for use around refreshment establishments for the dispensing of syrups or drinks of various descriptions.

The primary object of the invention is to provide an improved measuring valve designed to measure and dispense liquids in a desired quantity.

A further object of the invention is to provide an improved device of this character whereby the quantity of liquid to be dispensed may be minutely regulated as to the quantity of liquid to be dispensed upon each movement of the discharge means of the device.

A still further object of the invention is to provide an automatic measuring valve embodying features whereby a measured quantity of the liquid is at all times ready to issue from the valve as soon as the discharge means is manually operated.

A still further object of the invention is to provide a device of this character which is extremely simple and durable in construction, and which may be readily disassembled for the replacing of any of the operating parts thereof.

Other objects and advantages of the invention will be apparent during the course of the following detail description, taken in connection with the accompanying drawings forming a part of this specification and in which drawings:

Figure 2 is an enlarged transverse fragmentary section taken substantially on the line 2—2 of Figure 1.

Figure 3 is an enlarged transverse section through the lower portion of the faucet, taken on the line 3—3 of Figure 1.

Figure 4 is an enlarged central section through the regulating means of the device.

Figure 5 is an enlarged fragmentary section through the lower portion of the discharge valve.

Figure 1:
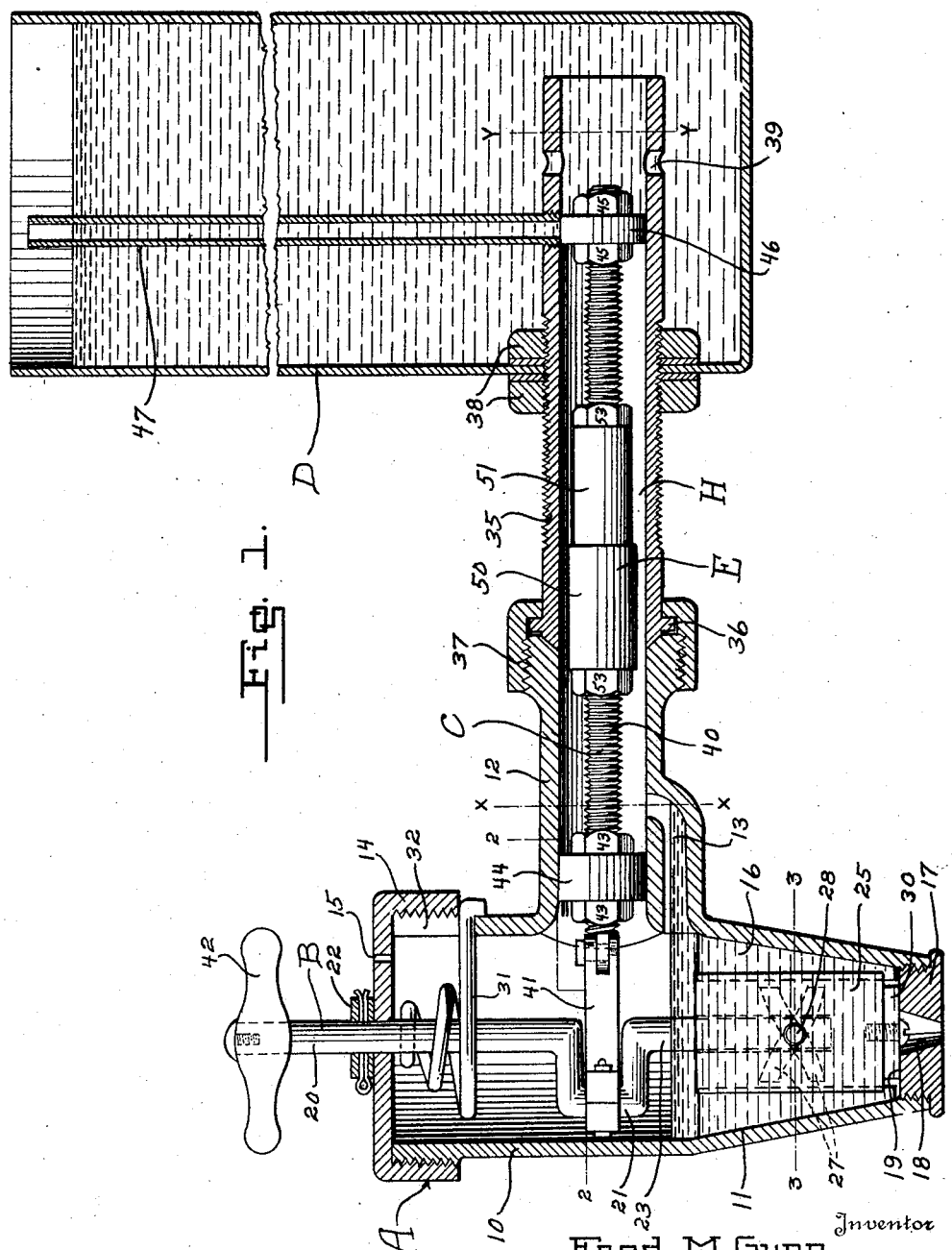
Figure 1 is a central vertical section through the improved device showing the same connected with a source of liquid supply, and showing a measured quantity of the liquid in the chamber of the faucet to be discharged immediately upon operating of the handle.

Referring to the drawings in detail, and wherein similar reference characters designate corresponding parts throughout the several views: The letter A may designate a faucet of special formation, and provided with the discharge means B; C the automatic measuring means operable by the discharge means B; D a supply tank or container communicating with the faucet A through the measuring means C, and E regulating means for regulating the quantity of liquid to be measured by the measuring means C.

Referring to the faucet A, the same is formed with a body portion 10 having a conical shaped valve or discharge chamber 11 provided at its lower end and above which extends in right angular relation to the body 10, a neck portion 12 being provided with external screw threads at its outer end and having its inner end flaring into the body portion 10. Extending from a point between the ends of the neck portion 12 and communicating with the discharge chamber 11 is a discharge port 13. This port 13 and as will be observed in Figure 1 extends below the neck portion 12. The upper end of the faucet is provided with external screw threads for threaded reception of a closure cap 14 preferably provided with a vent 15. Provided inwardly of the conical shaped lower portion of the body portion 10 and extending into the valve chamber 11, are diametrically disposed guides 16 having their inner or confronting edges extending in parallel relation to one another. Threaded into the lower end of the conical shaped casing 11 is a nozzle 17 provided with an axially disposed discharge opening 18 and provided at its inner end with a flat valve seat 19.

The discharge means B embodies a stem 20 which extends vertically through the body portion 10, and which stem is provided intermediate its ends with a crank portion 21 disposed in axial relation to the neck portion 12. The upper end of the stem may be rotatably mounted axially of the cap 14, and outwardly of the cap a washer 22 may be provided for preventing longitudinal shifting of the stem within the body portion of the faucet. Extending below the crank 21 is a lower stem portion 23 which extends into an upwardly opening socket 24 provided in a cylindrical shaped valve block 25. This valve block 25 which is adapted for positioning axially within the discharge chamber 11, has provided in its peripheral face, diametric longitudinally extending guideways 26 which are adapted to receive the guides 16 for permitting of longitudinal movement of the valve block but preventing rotary movement thereof. Provided substantially midway of the length of the valve block, and opening into the cylindrical socket 24, are diagonally extending guideways 27 arranged in oppositely extending relation to one another as illustrated in Figure 1. As will be observed in Figure 3, these guideways 27 are arranged at diametrically opposite sides of the socket 24. Extending through the lower stem portion 23, is a pin 28 which is adapted to travel in the guideways 27 upon rotation of the stem and which movement of the stem will cause the valve block to move upwardly or downwardly in accordance with the direction in which the stem is rotated. Suitable apertures 29 may be provided in the valve slot 25 for permitting of the pin 28 being positioned in operative relation with the lower stem portion. A disc shaped gasket 30 is secured to the lower end of the valve slot 25 for seating flat upon the valve seat 19 and closing the discharge opening 18 when the discharge means is in a normal or off position. A coil spring 31 coiled about the stem above the crank 21, has one end rigidly secured to the stem and its opposite end secured in the wall of the body portion 10 below the cap 14. An upwardly opening slot 32 may be provided in the body portion 10 for permitting of the outer end of the spring being slid into proper position during the assembling of the device. This spring 31 is adapted to act upon the stem 20 for normally urging the crank portion 21 to a position away from the neck portion 12 as illustrated in Figure 1. It will be seen that when the crank 21 is in its normal position as in Figure 1, that the gasket 30 is in a position for closing the discharge opening 18.

Referring now to the measuring means C, the same embodies a tubular sleeve 35 preferably of an inside diameter equal to the inner diameter of the neck portion 12, and which sleeve has provided at its outer end an annular shoulder 36 against which the flange of a locking nut 37 engages when threaded upon the outer end of the neck portion 12 for coupling the neck portion in axial alignment with the sleeve. This sleeve 35 is adapted to extend for a distance into the container G and be held in position as by suitable clamping nuts 38 disposed inwardly and outwardly of the container. Provided adjacent the inner end of the sleeve, and inwardly of the container, is a series of radially arranged inlet ports 39. Extending longitudinally and axially within the measuring chamber H formed by the neck 12 and sleeve 35, is a valve rod 40 provided with screw threads throughout its length, and having its forward end pivotally connected to one end of a link 41 extending into the faucet A. The opposite end of the link 41 is connected to the crank 21 so that when the stem 20 is manually rotated as by the handle 42, a reciprocatory motion will be imparted to the rod 40. Fitting upon the outer end of the valve rod 40 adjacent the body portion 10 of the faucet, and held against longitudinal shifting by the oppositely disposed jam nuts 43, is a release piston valve 44 adapted to snugly engage the inner wall of the neck portion 12. Secured upon the inner end of the rod 40 and held for movement therewith as by means of jam nuts 45, is an inlet piston valve 46 for opening and closing communication between the container E and chamber H. With the various movable elements of the device in a normal position as indicated in Figure 1, it will be seen that the discharge chamber 11 is in communication with the measuring chamber H through the discharge port 13, and that communication between the supply container E and the measuring chamber H has been closed by means of the inlet valve 46. Upon rotation of the stem 20 through 180°, the valve 44 will be centered over the line x—x, thus closing the discharge port 13, while the valve 46 will be centered over the line Y—Y, thus opening communication between the tank D and chamber H through the ports 39.

Threaded into the sleeve 35 forwardly of the inlet ports 39, is a vent pipe 47 communicating at its lower end with the chamber H and extending above the highest level of the liquid within the container D. This vent pipe 47, when the measuring means is in a position for filling of the chamber H, allows for the air to readily escape from the chamber H when being filled. Since during the filling operation of the chamber H, the liquid in the container will rise to a like level in the vent pipe 47, it is desirable that the valve 46 close the vent pipe when the valve is in its normal position as in Figure 1 so that the liquid in the vent pipe will be prevented from entering the chamber H when discharging into the faucet A. Such closing of the vent pipe 47 is desirable since the level of the liquid in the container will vary as the same is being drawn off, and which would allow for varying amounts of the liquid to be dispensed in accordance with the amount of liquid retained in the vent pipe when the chamber H is emptied into the chamber of the faucet. If desirable, means may be provided for maintaining the liquid in the container B at a constant level, and in which case the valve 46 may move rearwardly of the vent pipe for affording freer movement of the liquid in the measuring chamber H, into the faucet. The vent opening 15 will allow for escapement of air within the body portion 10 and thus allow the liquid to drain from the chamber H into the discharge chamber 11.

The quantity regulating means E embodies a pair of telescoping drums 50 and 51 threaded upon the rod 40. These telescoping drums 50 and 51 each have their closed end walls provided with threaded bores 52 so that upon rotation of the drums in an opposite direction to one another the external area of the drums may be varied for occupying more or less area within the measuring chamber H. Binding nuts 53 threaded upon the rod 40 at each end of the shell formed by the drums 50 and 51 are turned into binding engagement with the end walls of the drums for acting as jam nuts to prevent relative movement of the drums when adjusted. Thus it will be seen that by so varying the external area of the telescoping drums 50 and 51, an effective means has been provided for regulating the quantity of liquid which will enter the measuring chamber H.

In operation, it will be apparent that upon gripping of the handle 42 and rotating the same through 180° in either direction, that the valve block 25 will be raised by reason of the pin 28 engaging the diagonally extending guideway 27, thus opening the discharge opening 18 and allowing the liquid in the discharge chamber 11 to readily flow from the faucet. During this rotation of the stem 20, the rod 40, through action of the crank 21 and link 41, will be moved inwardly, the release piston valve closing the discharge port 13 and the inlet piston valve 46 moving inwardly past the ports 39 thus allowing filling of the chamber H with a predetermined amount of the liquid from the container D. Upon releasing of the handle 42 the spring 31 acting upon the stem 20 will draw the valve rod 40 outwardly thus opening the discharge port 13 and closing communication between the tank D and vent pipe 47 as by the inlet piston valve 46. The valve block 25 at this time has also been forced downwardly through action of the pin 28 and guideways 27, thus closing the discharge opening 18, and allowing the measured quantity of liquid in the chamber H to be emptied in the discharge chamber 11.

From the foregoing description of the invention it will be apparent that a novel and efficient automatic measuring valve has been provided whereby the ability to minutely regulate the quantity of liquid to be measured has been provided, and embodying a novel arrangement whereby a measured quantity of the liquid is at all times ready to issue from the valve as soon as the same is manually operated.

Changes is detail may be made to the form of the invention herein shown and described, without departing from the spirit of the invention or the scope of the following claims.

I claim:

1. A liquid measuring valve comprising a faucet having a discharge chamber provided with a discharge opening at its lower end, a valve block reciprocally mounted in the discharge chamber for opening of the discharge opening, means for manually raising the valve block for opening of the discharge opening, a measuring chamber communicating with the discharge chamber, means reciprocally mounted in the measuring chamber and connected to the manually operable means for simultaneously closing communication between the measuring and discharge chambers upon raising of the valve block, and means for simultaneously opening communication between the measuring and discharge chambers upon downward movement of the valve block for closing of the discharge opening.

2. A liquid measuring valve comprising a faucet embodying a discharge chamber provided with a discharge opening, a valve for opening and closing of the discharge opening, a measuring chamber having a port communicating with the discharge chamber, a valve rod reciprocably mounted in the measuring chamber and having piston valves carried by each end thereof, a stem rotatably mounted in the faucet and operatively connected to said first mentioned valve for actuating same to control the discharge opening, said stem having a crank, means connecting the forward end of the valve rod with said crank whereby upon partial rotation of the stem the discharge opening will be opened, and the port between the measuring and discharge chambers closed, and spring means acting upon the stem for returning the stem and valve rod to a normal position whereby the port between the measuring and discharge chambers will be opened and the discharge opening of the discharge chamber closed.

3. A liquid measuring valve comprising a faucet having a discharge chamber provided with a discharge opening at its lower end, vertically extending guides formed inwardly of the faucet above the discharge opening, a valve block reciprocably mounted on the guides for closing of the discharge opening, a stem rotatably mounted in the faucet and connected at its lower end to the valve block for reciprocating the block upon rotation of the stem in either direction, and a measuring chamber communicating with the discharge chamber and provided with a valve means connected to the stem whereby upon lowering of the valve block a predetermined amount of liquid will enter the discharge chamber from the measuring chamber.

4. A liquid measuring valve comprising a faucet having a discharge chamber provided with a discharge opening, a stem rotatably mounted in the faucet and provided with a crank, a valve block operatively connected to the lower end of the stem for opening and closing of the discharge opening upon rotation of the stem, a measuring chamber having a port communicating with the discharge chamber of the faucet, a valve rod reciprocally mounted in the measuring chamber and having piston valves carried by each end thereof forming end closures for the measuring chamber, means operatively connecting the valve rod to the crank of said stem for imparting a reciprocatory motion to the valve rod and piston valves, one of said piston valves serving for opening and closing communication between the measuring and discharge chambers, and means for regulating the quantity of liquid to be discharged from the measuring chamber into the discharge chamber.

5. In an automatic measuring valve, the combination of a liquid supply tank, a faucet having a discharge chamber provided with a discharge opening, a valve for opening and closing the discharge opening, means for imparting movement to said valve embodying a stem provided with a crank, a measuring chamber having a discharge port at one end communicating with the discharge chamber of the faucet and having inlet ports provided at its opposite end communicating with the liquid supply tank, a valve rod mounted in the measuring chamber and having piston valves carried by each end thereof for alternately opening and closing the discharge and inlet ports at the opposite ends of the measuring chamber, means operatively connecting the valve rod to the crank of said stem for imparting reciprocatory movement to the valve rod, and means carried by the rod between the piston valves thereof for varying the area of the chamber between the piston valves.

6. In an automatic liquid measuring apparatus, the combination with a liquid supply tank and a faucet having a discharge chamber and discharge means for the chamber, a measuring chamber forming communication between the liquid supply tank and discharge chamber, a valve rod mounted in the measuring chamber and reciprocal by the discharge means of the faucet upon opening and closing of the discharge chamber, piston valves carried by each end of the valve rod for alternately opening and closing communication first with the discharge chamber of the faucet and then with the liquid supply tank, and adjustable means carried by the valve rod for varying the amount of liquid entering the measuring chamber when in communication with the liquid supply tank.

7. In combination with a liquid supply tank and a faucet including a body portion having a discharge chamber and provided with a valve and valve controlling means, means interposed between the tank and faucet body portion for automatically measuring a quantity of liquid to be discharged into the discharge chamber of the faucet body portion, comprising a chamber communicating at one end with the discharge chamber and at its opposite end with the supply tank, a valve rod operable by the valve controlling means of the faucet, reciprocally mounted in the chamber and having piston valves carried by each end thereof for alternately opening and closing communication between the supply tank and discharge chamber and forming a measuring chamber, and telescoping drums carried by the valve rod between said piston valves for varying the area of the measuring chamber.

8. In an automatic liquid measuring valve and in combination with a liquid supply tank, a faucet having a discharge chamber provided with a discharge opening, a valve block reciprocally mounted for opening and closing of the discharge opening, a manually rotatable stem connected with the valve block for movement thereof, and means operatively connected to the stem and reciprocal laterally thereof whereby upon rotation of the stem a measured quantity of liquid will be discharged into the discharge chamber from the liquid supply tank.

FRED M. GUNN.